INVENTORS
HAROLD OSTERBERG
BY ALVA H. BENNETT
Herbert C. Kimball
ATTORNEY

Aug. 1, 1950     H. OSTERBERG ET AL     2,516,905
MICROSCOPE WITH VARIABLE POLARIZING AND BIREFRINGENT
MEANS FOR PRODUCING CONTRAST IN OPTICAL IMAGES
Filed July 2, 1946     3 Sheets-Sheet 2

INVENTORS
HAROLD OSTERBERG
BY ALVA H. BENNETT

Herbert C. Kimball
ATTORNEY

INVENTORS
HAROLD OSTERBERG
ALVA H. BENNETT
BY
Herbert C. Kimball
ATTORNEY

Patented Aug. 1, 1950

2,516,905

UNITED STATES PATENT OFFICE 2,516,905

MICROSCOPE WITH VARIABLE POLARIZING AND BIREFRINGENT MEANS FOR PRODUCING CONTRAST IN OPTICAL IMAGES

Harold Osterberg, Buffalo, and Alva H. Bennett, Kenmore, N. Y., assignors to American Optical Company, Southbridge, Mass., a voluntary association of Massachusetts Application July 2, 1946, Serial No. 681,066

16 Claims. (Cl. 88—39)

This invention relates to the control of the light rays incident in a microscope or the like upon an object to be observed, and of the light subsequent to its diffraction by the object, so as to control contrast in the image formed of the object, especially when the latter is so nearly uniform in transparency or surface texture (if it is an opaque or semi-opaque object) as to give little or unsatisfactory indication of structure by ordinary methods of microscopy.

A method is known of bringing out contrast in an object being studied by means of a microscope, according to which the illuminating beam is admitted to the substage condenser through a predetermined aperture, and a corresponding disc for modifying the amplitude of the light transmitted by the object or its phase or both is so positioned with relation to the microscope objective that the aperture and disc are placed at the entrance and exit pupils respectively of the composite optical system made up of the microscope condenser and the microscope objective. This arrangement results in the aperture being focused on the disc.

It has been previously observed by Osterberg and Schrader, as stated in their application Serial No. 456,726 filed August 28, 1942, and issued September 23, 1947, as Patent No. 2,427,689, that a single disc is not adequate to give optimum results for a variety of objects. A number of different discs are suggested in the application mentioned. It would not only be more convenient to have a single disc which would give the desired range, but if it could be gradually and uniformly varied throughout the range it could be adjusted so as to give the optimum conditions for observing each of various objects.

The present invention has for its object to provide continuously variable phase difference or amplitude ratio or both as between the deviated and undeviated spectra which form the image of the object being observed, by modifying the image forming rays in a microscope with the purpose of obtaining desired contrast in the image.

The basic principle of the technique mentioned above of varying contrast in the image is interference between the deviated and undeviated spectra which form the image. If a point source in the aperture be considered, it will be found that not only will a bundle of undeviated rays be brought to a focus in what may be termed the conjugate area of the exit pupil of the microscope condenser and objective combined, but also there will be deviated bundles due to diffraction by the object which will pass through what may be termed the complementary area of the exit pupil. The conjugate area coincides with the geometrical image of the aperture in the entrance pupil, and is of special importance because the undeviated bundle (also called the zero order and central maximum) passes through this area. The main portion of the deviated bundle (also called higher orders) passes through the complementary area.

The absorption disc or the phase modifying disc, which is the simplest instrumentality for obtaining contrast in the image being observed, is placed in this conjugate focal plane (i. e. the exit pupil). The effect of the disc upon the deviated bundle relative to the undeviated bundle is to cause a change in phase or amplitude (or both) of one bundle relative to the other; and through the phenomenon of interference, details in the object being examined are brought into contrast which otherwise would be imperceptible.

We have discovered that this interference phenomenon is obtained if one bundle of rays be differently polarized at the exit pupil with reference to the other bundle and advantage be then taken of this difference in polarization to introduce a relative difference in amplitude or phase (or both) between the deviated and undeviated bundles of rays. If the one bundle of rays is thus differently polarized with reference to the other, it is not required that the modification of phase or amplitude take place in the above mentioned conjugate focal plane (or back focal plane of the objective). It is sufficient to effect the desired modification of phase previous to formation of the image by the combined bundles of rays, and indeed the means for effecting amplitude modification can be located between the source of illumination and the exit pupil.

The invention will now be further discussed in connection with the accompanying drawings in which Fig. 1 is a diagrammatic view of the optical system of a microscope operable in accordance with our invention for continuously varying the phase and/or amplitude of one of the spectra relative to the other for obtaining desired contrast in the image of the object being observed;

Figure 1:
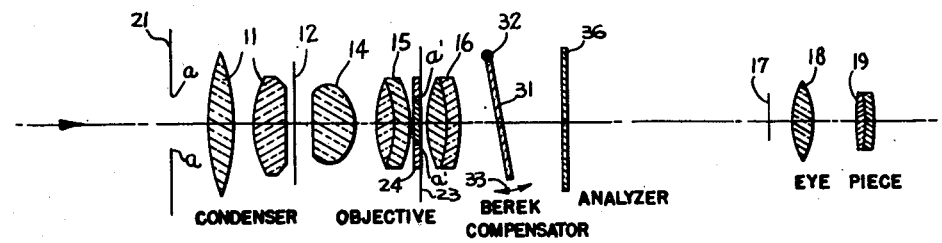

The optical system diagrammatically illustrated in Fig. 1 includes the usual condenser lenses 11 which are disposed in the substage of the microscope. On the other side of the object plane indicated at 12 are the objective lenses. As the particular form of these objective lenses does not constitute a part of our invention, the objective lenses are shown conventionally as including a strong positive lens 14 and two doublets 15 and 16. The objective lenses form an image, in the plane 17, which may be viewed through the eyepiece comprising the lenses 18 and 19. Thus far, the constituent parts of the microscope being described are conventional and cooperate in the usual way for the viewing of a specimen or the like in the object plane 12.

The improved contrast in the image perceived by means of the eyepiece 18—19 is brought about through diffraction originating in the control of the light rays passing through the object in the plane 12. A diaphragm 21 is provided, the periphery of whose aperture is indicated by $a$, $a$. If we consider that the object in the plane 12 is made up of a configuration of points and that each point produces a corresponding image in the plane 17, then any one of these points may be taken as an example an the rays may be traced which pass through this given point, bearing in mind the diffraction phenomenon between the given point and the other points of the configuration.

The condenser lenses 11 concentrate light from the aperture $a$ of the diaphragm 21 upon such a point; and from the given point, the light spreads out again to reproduce the aperture $a$ as its image $a'$ in the above mentioned conjuate focal plane or exit pupil 23. Not all of the light passing through the given point is confined to this one bundle of rays which is known as the undeviated bundle; but due to the above mentioned diffraction phenomenon, some of the light passing through the given point is deviated and is outside of the conjugate area $a'$, $a'$ (the undeviated bundle).

Figure 5:
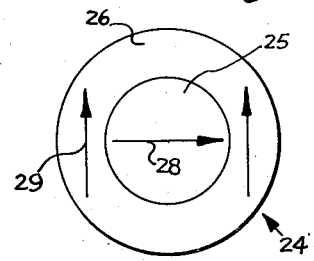
Fig. 5 is a front detail view of an element of the system of Fig. 1 which serves to differently polarize the deviated bundle of rays from the undeviated bundle.

If we were to follow the technique described in the above mentioned application of Osterberg and Schrader, Serial No. 456,726, a disc would be inserted in the plane 23 for varying the amplitude and phase of the undeviated bundle of rays $a'$, $a'$ relative to amplitude or phase or both of the deviated bundle of rays surrounding the area $a'$, $a'$. In order to place at the disposal of the microscopist continuous variation as between the deviated and undeviated bundles or spectra, polarizing means 24 of the character illustrated in Fig. 5 is arranged in the plane 23. Such polarizing means may be applied on the surface of one of the objective lenses, or as shown in Fig. 1 may be carried by a separate element in the form of a disc or plate. The central area 25 of the polarizing means 24 corresponds to the above mentioned conjugate area $a'$, $a'$ and accordingly it accurately conforms to the undeviated bundle of light passing through a given point in the object plane 12. The surrounding area 26 of the polarizing means 24 is the so-called complementary area through which most of the deviated bundles of rays pass.

In order to differently polarize the conjugate area 25 from the complementary area 26, we prefer to mount on one of the objective lenses or to mount between thin lamellae of optical quality glass (which mounting thus constitutes an element separate from the objective lenses) two portions of polarizing sheeting such as is wellknown and in commercial use for many optical purposes at the present time. One portion is of the size and shape of the conjugate area 25 and has its axis of polarization in any given orientation, for instance, as indicated by the arrow 28. The other portion is of the size and shape of the annulus 26 or complementary area, and may also be of like polarizing sheeting. It will have its axis of polarization differently disposed, as for instance indicated by the arrow 29. It will be assumed, unless otherwise specified, that the arrows 28 and 29 are not necessarily at right angles to each other; since in the broad aspect of our invention it is merely necessary to differently polarize the area 25 from the area 26. Even though the different portions do not have the axes of polarization substantially at right angles to each other, a variation in phase or amplitude may be accomplished. The particular embodiments illustrated, however, give best results when the axes of polarization are arranged at right angles to each other.

With the optical system of Fig. 1 as thus far described, each point of the object in the plane 12 gives rise to an undeviated bundle of rays passing through the polarizing area 25 and a deviated bundle of rays passing through the differently polarized area 26. The polarization alone of these rays or spectra would not give rise to any greater contrast in the image produced; but because the deviated and undeviated bundles are differently polarized, it is possible to cause them to undergo suitable modification at any subsequent location prior to the formation of the desired image, and through such modification to bring about increased contrast.

In the embodiment illustrated in Fig. 1, a simple instrumentality is employed in the form of a birefringent plate 31 pivoted at 32 for tilting as indicated by the double headed arrow 33. With this plate 31 cooperates a polarizing element 36 such as a suitably protected sheet of polarizing material such as the above mentioned sheeting. This birefringent plate 31 is arranged with its optical axis normal to the plane of the plate and with its X axis so related to the axes of polarization of the areas 25 and 26 that this X axis is parallel to one axis of polarization and perpendicular to the other. A calcite plate is an excellent example of a plate which may be used as the birefringent plate 31. After passing through the plate 31, either the deviated bundle of rays or the undeviated bundle becomes the ordinary ray. The other becomes the extraordinary. Because the plate 31 can be tilted about the pivot 32 with reference to the polarizing means 24 and the polarizing element 36, the phase difference of the two bundles can be varied gradually and continuously by tilting the plate 31 from normal as indicated by the arrow 33. This plate 31 is in this relation, therefore, essentially a Berek Compensator.

Mere difference in phase, which can be introduced by tilting of the plate 31, will in some instances provide optimum contrast in the object under observation. With other specimens, it may be desirable to introduce instead a variation in the amplitude ratio and in still others it may be that the best contrast is obtained by introducing changes both in the phase and the amplitude. To provide for this, the polarizing element 36 is so mounted as to be rotatable about the optical axis of the microscope, as is commonly the fashion with the analyser of a polarizing microscope.

In the operation of a microscope having an optical system such as illustrated in Fig. 1, the diaphragm 21 is adjusted so that its aperture $a$ is accurately imaged at $a'$ in the plane 23. It may be found desirable to do this at the factory when the microscope is assembled. The polarizing means 24 may also be permanently located in the exit pupil of the lens system made up of the lenses 11, 14, 15 and 16. When an object is being observed which has such uniform transparency that but little detail can be perceived by ordinary methods, the contrast in the image can often be improved by adjustment of either the tilting plate 31 or the rotatable analyzer 36 or both. The analyzer 36 will, upon rotation, bring about in a continuous manner such variation in the amplitude ratio between the deviated and undeviated bundles as to take advantage of any characteristics that the object under observation may have. For instance, various portions of the object may appear to be equally transparent and yet because of differences in refractive index or other differences may impart variations to the light transmitted by these various portions of the object.

The plate 31 has its X axis parallel to the axis of polarization of either the deviated or the undeviated bundle of rays. The phase of one of these bundles can, therefore, be varied continuously to introduce any desired phase difference between the deviated and undeviated spectra. As pointed out in said application of Osterberg and Schrader, Serial No. 456,726, it is of advantage to introduce a variation not only in the amplitude ratio but also in the phase difference and frequently to make use of both simultaneously. The optical system illustrated in Fig. 1 has been arranged so that not only can both be varied but they can both be varied gradually and continuously and thus increase contrast in the image.

Figure 2:
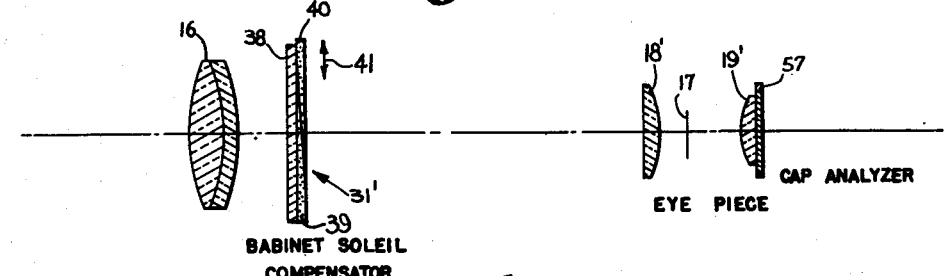
Fig. 2 is a diagrammatic view of a modification of a detail of the system illustrated in Fig. 1.

A greater range of phase can be obtained by substituting a Babinet Soleil Compensator for the Berek Compensator shown at 31 in Fig. 1. Such a Babinet Soleil Compensator is illustrated in Fig. 2. This Compensator indicated in general by the numeral 31' is made up of a birefringent plate 38 such as a quartz plate and two birefringent wedges 39 and 40. These wedges are also preferably of quartz. The optical axes of the two wedges are parallel to each other and perpendicular to the optical axis of the plate 38, the latter axis being in the plane of the plate 38. The optical axis of the latter is arranged parallel either to the arrow 28 or to the arrow 29 so that the relative phase of the deviated and the undeviated bundles may be continuously varied. Such variation in phase is brought about by relative movement between the wedges 39 and 40 in the direction indicated by the double headed arrow 41. Such operation of the Babinet Soleil Compensator performs the same function as the tilting of the Berek Compensator 31 illustrated in Fig. 1, this Babinet Soleil Compensator being substituted in that optical system for the plate 31. Another form of compensator which may be substituted for the plate 31 in the optical system of Fig. 1 is the device illustrated in Fig. 3. This is a combination of a birefringent plate 43 with a long thin slow birefringent wedge 44. Operation of this device is affected by sliding the wedge 44 relative to the plate 43 as indicated by the double headed arrow 45. In this device the optical axis of the wedge 44 is perpendicular to the optical axis of the plate 43 and each of these axes is in the plane of its element 43 or 44. This device performs the function of the compensator shown at 31 in Fig. 1 and may be substituted therefor in order to bring about the continuous and gradual variation in phase between the deviated and undeviated spectra.

Figure 4:
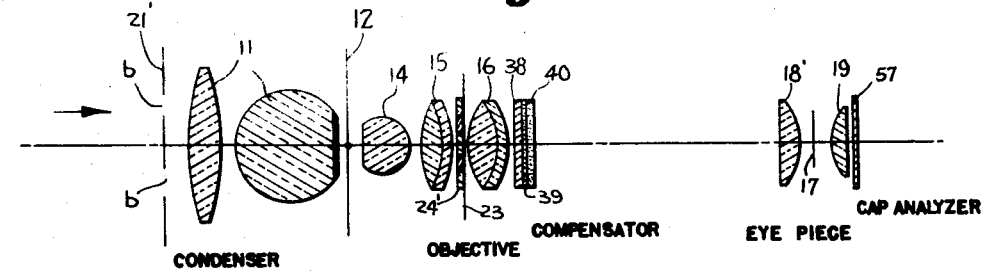
Fig. 4 is a diagrammatic view similar to Fig. 1 of the optical system of a microscope provided with a different form of diaphragm and corresponding instrumentalities for continuously varying the phase and/or amplitude of the respective spectra relative to each other.
Figure 6:
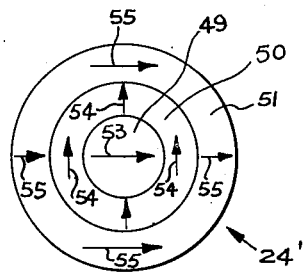
Fig. 6 is a front detail view of the corresponding element of the system of Fig. 4.

The optical system of Fig. 4 shows, by way of illustration, two respects in which the optical system of Fig. 1 may be varied. The aperture $a$ of the latter system may be inferior for certain purposes to an annular aperture such as shown at $b, b$ in Fig 4. Of course the image of the annular aperture $b, b$ which is formed in the conjugate focal plane 23 is also annular. Accordingly the means 24' for differently polarizing the deviated and the undeviated bundles of rays is formed in three portions as shown in Fig. 6. The central portion 49 is a circular area forming part of the complementary area and is surrounded by an annular conjugate area 50, through which pass the undeviated bundles of rays. The annular complementary area 51 surrounds the conjugate area 50. The plane of polarization of complementary areas 49 and 51 should be the same and angularly related to the plane of polarization of the annular conjugate area 50, the arrows 53, 54 and 55 indicating respectively the planes of polarization of the areas 49, 50 and 51.

The relation between the undeviated bundles of rays and the deviated bundles of rays is somewhat different in the optical system illustrated in Fig. 4 from that in the optical system of Fig. 1, inasmuch as the undeviated bundles of rays, originating in the annular aperture $b, b$, both surround a deviated bundle of rays and are enclosed by deviated bundles of rays; and so the interference effect may be different.

Figure 3:
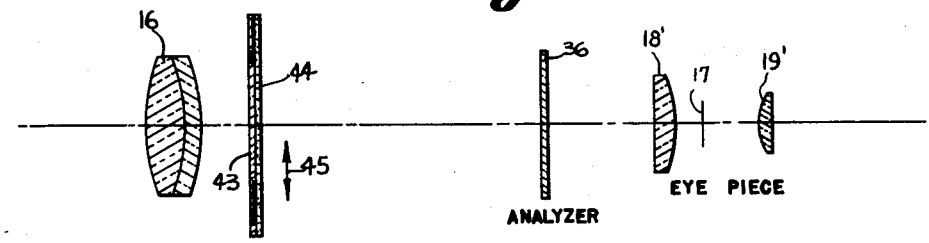
Fig. 3 is a similar view of another such modification.

The instrumentality for cooperating in varying the phase difference of these bundles of rays may be the tiltable plate 31 or a more elaborate device for this purpose such as those illustrated in Figs. 2 and 3. The amplitude ratio may be varied by an analyser 36 disposed as shown in Fig. 1, or if more convenient a cap analyser 57 disposed as shown in Figs. 2 and 4 may be rotated to vary the amplitude ratio. This may either be done simultaneously with the variation of the phase difference or separately, as called for in obtaining the desired contrast in the image.

Figure 7:
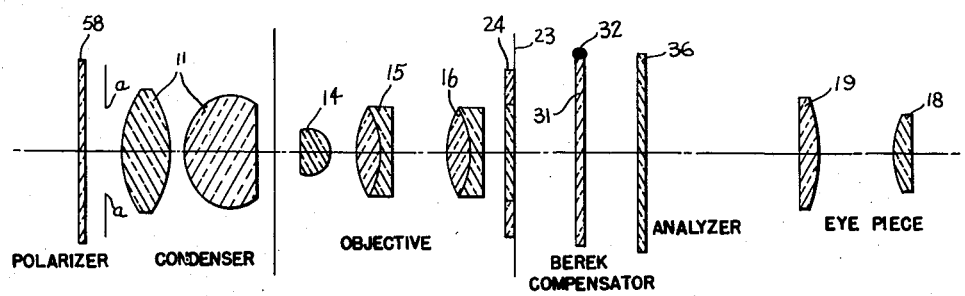
Fig. 7 is a diagrammatic view of a further modification of the optical system of Fig. 1.

In Fig. 7 is illustrated an optical system having improved means for controlling the amplitude ratio between the deviated and undeviated bundles of rays. The light passes through an aperture a of the diaphragm 21, and is directed upon the object by a condenser 11 as before. The polarizing means 24 is at the exit pupil of the composite system made up of the condenser 11 and objective lenses 14, 15 and 16. An adjustable retardation plate, such as Berek compensator 31, is arranged between the polarizing means 24 and the analyser 36 so that the image viewed through the eyepiece 18, 19 may be improved by adjusting the compensator and thus varying the phase difference between the deviated and undeviated spectra. As thus far described, the optical system of Fig. 7 does not differ in important respects from the system of Fig. 1.

The addition of a polarizer 58, which may for instance be made in substantially the same way as the polarizing element 36, for polarizing the light reaching the polarizing means 24 and for varying the plane of polarization of that light, has valuable advantages. This polarizing element 58 which is mounted for rotation about the optical axis of the system may be variously located along the optical axis, provided it precedes the polarizing means 24 so as to polarize the light passing thereto; but we prefer to locate the polarizer 58 below the condenser. When this polarizer 58 is rotated, thereby altering the plane of polarization of the light passing to the polarizing means 24, the amplitude ratio above referred to is varied with a minimum of disadvantageous effect upon the sharpness or crispness of image observed. When the system includes the polarizer 58, it is unnecessary to rotate the analyzer 36 (or cap analyzer 57) and the axis of the latter may be fixed relative to arrows 28 and 29. We are unable to entirely account for the improved operation of this arrangement over that illustrated in Fig. 1, but a real improvement has been noted when the polarizer 58 has been used.

Figure 8:
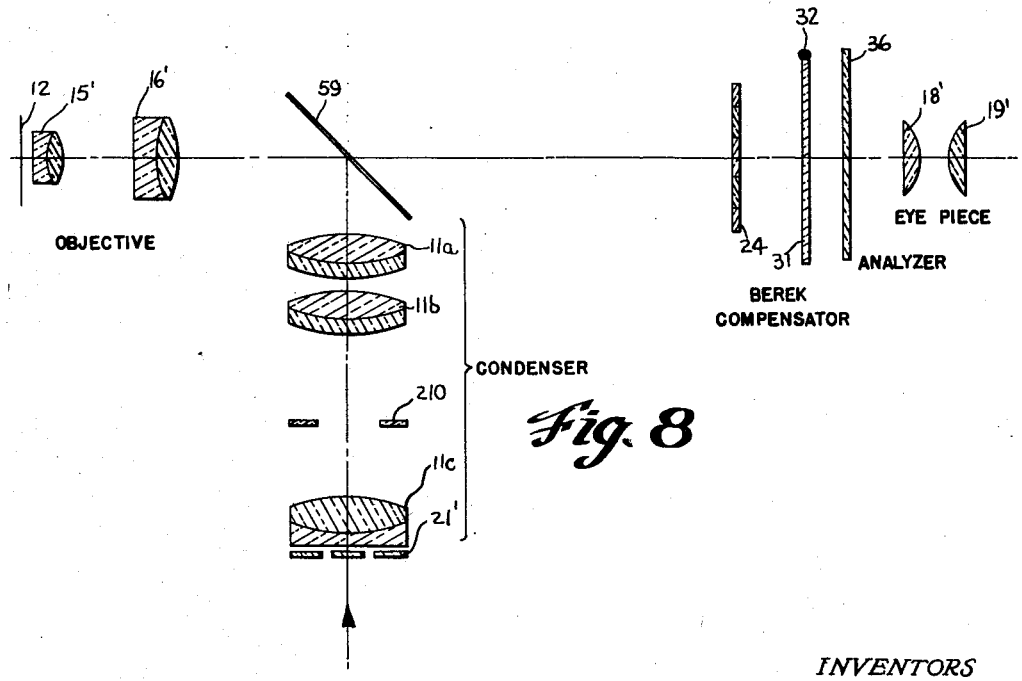
Fig. 8 is a diagrammatic view of the optical system of a microscope embodying our invention when adapted to the study of opaque or semiopaque objects which do not lend themselves to illumination by light transmitted through the object.

Fig. 8 illustrates how our invention may be employed when the light for illuminating the object is not transmitted therethrough. An opaque or semiopaque object in the plane 12 is imaged by the objective 15′, 16′ so that this image may be observed through the eyepiece 18′, 19′. As is usual in using a vertical illuminator, a semi-reflecting mirror 59 is tilted 45° with relation to the optic axis of the microscope to reflect upon the object light received from a light source (not shown). In addition to the lenses 11a, 11b and 11c for concentrating the light upon the object, there is provided a field stop iris 210. Considering the lenses 11a, 11b, 11c and the objective lenses 15′, 16′ as a composite system, an aperture diaphragm 21′ is disposed at the entrance pupil of this system and polarizing means 24 are disposed at the exit pupil of this system. The remainder of the system is substantially the same as the one illustrated in Fig. 1, variation in phase difference between the deviated and undeviated spectra being brought about by means of an adjustable retardation plate 31 pivoted at 32 and variation in amplitude ratio being brought about by rotation of analyzer 36 about the optic axis of the microscope.

Figure 9:
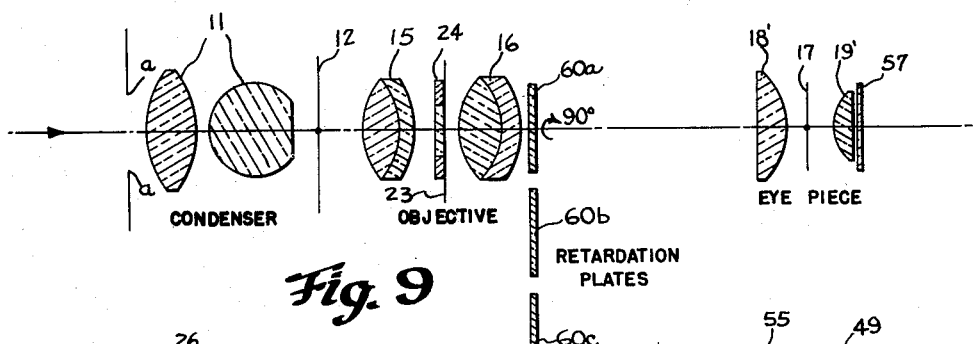
Fig. 9 is a diagrammatic view showing further modifications of the optical system of Fig. 1.
Figure 10:
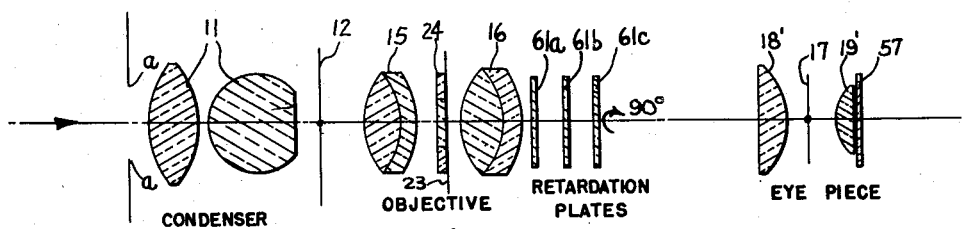
Fig. 10 is a diagrammatic view of a modification of a detail of the system illustrated in Fig. 7.

If now we come to a situation in which it is desirable to vary the relative amplitude in a gradual and continuous manner, but find it sufficient to vary the phase difference in steps, we may resort to the instrumentalities illustrated in Figs. 9 and 10. The form of aperture may be varied, but for purposes of illustration, the simpler form of aperture a has been shown. Accordingly the polarizing means in plane 23 is of the type shown in Fig. 5. In place of the compensators described in connection with Fig. 1, we have substituted a birefringent plate or a series of birefringent plates 60a, 60b, 60c, etc. each having its optical axis normal to the optical axis of the microscope. If a series is employed, the plates are selected to have different retardations, and the same are rotatably mounted in a slide or in a ring so carried by the microscope that any one of the series may be slid or swung into alignment with the optical axis of the instrument, and so oriented that the X axis of the plate is parallel to either the arrow 28 or the arrow 29, thereby giving any one of the various retardations of the series. Furthermore, in one position of the slide or ring, an opening is in alignment with the optical axis, so that zero change in phase is effected.

It is noteworthy that such instrumentalities considerably simplify the construction of the microscope as compared with the more elaborate design of Figs. 1 to 6 inclusive. Along with such simplification we lose the continuous variation in phase difference but not in relative amplitude because the latter feature is made available by the rotatable cap analyzer 57. As many birefringent plates are used as are required by the necessary latitude in the amount of phase difference. Under some circumstances but one birefringent plate is needed.

It is also noteworthy that if, when a given birefringent plate is aligned with the optical axis of the microscope, the plate is rotated about that axis, a reversal of contrast in the image is generally observed, inasmuch as the sign of the change in phase is reversed. As this is often useful in obtaining a more definite indication of structure in the object, it is preferable to mount each birefringent plate so that it may be rotated through 90° about the axis of the microscope when the plate is aligned therewith.

Figure 10 illustrates a more flexible modification of the arranagement of Fig. 9. Here a series of birefringent plates 61a, 61b, 61c, etc. are all permanently arranged on the optical axis of an optical system having the general characteristics described in connection with Fig. 9. These plates 61a, 61b, 61c, etc. may have their respective X axes parallel to either arrow 28 or arrow 29 and accordingly these X axes may at times be parallel to each other and at other times perpendicular to each other since these plates 61a, 61b, 61c, etc. are likewise mounted for individual and collective rotation about the microscope axis through 90°. If we take for example a set of four plates whose retardations vary as 4, 3, 2 and 1 respectively, we have available eleven different effective retardations including zero by selecting various combinations of the plates for rotation about the optical axis of the instrument.

Figure 11:
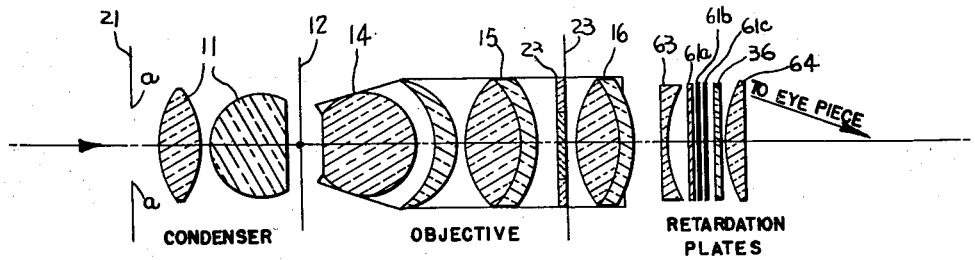
Fig. 11 is a diagrammatic view of a still further modification of the optical system of Fig. 1.

If a further refinement of any of the foregoing optical systems is desired, the system may be specially designed so that the light passing through the plate 31 or any variant thereof, and also that passing through the analyzer is parallel light. Fig. 11 illustrates one such optical system in which this is accomplished. The aperture a is imaged in the plane 23 as before. Furthermore, the deviated and undeviated spectra are differently polarized as before. After being polarized, the image forming rays are rendered parallel by the divergent lens 63 and thereafter are rendered convergent again by lens 64. Such infinity corrected systems are known in other relations, and we have found them advantageous in the present relation for the purpose of minimizing the effects of conical refraction and avoiding the tendency of a plate of finite thickness to form a double image in convergent light. This improvement is accomplished by disposing the compensator 31 or 31', the wedge 43, 44 or the birefringent plates of the systems shown in Figs. 9 or 10 and/or the analyzer 36 in the parallel light between lenses 63 and 64. For purposes of illustration the series of plates 61a, 61b, 61c, etc. in addition to the analyzer 36 are shown disposed in this relation in Fig. 11.

In all of the foregoing examples of how our invention may be applied to the solution of the problem of bringing out contrast during microscopic study and observation, for a given point in the object there is an undeviated bundle of rays and a deviated bundle. Control is effected of these bundles of rays, in each instance, by differently polarizing one bundle with respect to the other. Advantage is then taken of such polarization to introduce a differential in a wave characteristic between the deviated and undeviated rays. This difference in a wave characteristic may be a difference in phase, or it may be a difference in amplitude, or it may be both. So flexible is our invention that a gradual and uniform variation of the amplitude ratio between the two bundles or of the phase difference between the two bundles or a variation of both amplitude ratio and phase difference may be produced and controlled so as to bring about improved contrast for the given object.

There are considerable advantages to polarizing the deviated and undeviated bundles at the exit pupil of the composite optical system including the microscope objective. There are certain advantages, for instance, in that with this arrangement the light rays may be polarized after they leave the object. A further advantage is that the source of light may be below the object in case the latter is to be studied by transmitted light or may be a vertical illuminator in case the object is to be studied by reflected light. In accordance with our invention the deviated or the undeviated bundle of rays need not undergo a change in phase or a modification of amplitude at the above mentioned exit pupil. As shown by examples given, the gradual and uniform variation in phase of one of these bundles of rays relative to the other can be effected by an adjustable wave plate such as a compensator, or an analyzer associated with the microscope eye piece may be used to effect such a variation in amplitude ratio.

Such examples, while illustrating our invention, are not given by way of limitation, as our invention may be otherwise embodied and practiced within the scope of the following claims.

Attention is called to the Osterberg et al. copending application Serial No. 71,746, filed January 19, 1949, relating to the same subject matter of the invention.

Having described our invention, we claim:

1. Light control means for cooperating with the optical system of a microscope including a lens system for directing light to the object to be observed and a lens system for forming an image of said object, said control means functioning to modify contrast in said image and comprising a diaphragm associated with the first mentioned lens system having an aperture formed therein for admitting light having a predetermined contour to the first-named lens system, composite polarizing means associated with the second mentioned lens system for differently polarizing the deviated spectra and the undeviated spectra emanating from said object, said diaphragm aperture and said polarizing means being respectively disposed substantially at the entrance pupil of the first-named lens system and at the back focal plane of the second-named lens system, means cooperating with said polarizing means for altering the phase of one of said deviated and undeviated spectra, polarizing means cooperating with said composite polarizing means and said phase altering means to provide a given amplitude relation between said deviated and undeviated spectra, and means for gradually altering the position of at least one of said phase altering and polarizing means to obtain a gradual modification of contrast in an image of said object.

2. Light modifying means for inclusion in an optical system incorporating a condenser and an objective, said light modifying means being adapted to provide gradual changes of phase and amplitude of deviated and undeviated spectra emanating from an object under observation and comprising means forming an area of light of predetermined contour positioned at the entrance pupil of the optical system adjacent said condenser, a composite light-polarizing element positioned adjacent the back focal plane of said objective including a plurality of areas related in contour to that of said area of light and having different directions of polarization, said polarizing areas being adapted to substantially individually intercept said deviated and undeviated spectra and to differently polarize the same, birefringent means positioned between said light-polarizing element and an image plane of the optical system for modifying the phase of at least one of said deviated and undeviated spectra after differential polarization thereof, and a second light-polarizing element positioned between said birefringent element and the exit pupil of the system adapted to coact with said first-named light-polarizing element and birefringent means to provide a desired amplitude relation between said deviated and undeviated spectra, at least one of said light-polarizing elements and birefringent means being mounted for progressive positional adjustment with respect to another so that gradual alteration of contrast in an image of the object may be obtained.

3. Light modifying means for inclusion in an optical system incorporating a condenser, an objective and an eyepiece suitably positioned along an optical axis thereof, said light modifying means being adapted to provide gradual changes of phase and amplitude of deviated and undeviated spectra emanating from an object under observation and comprising means providing a light source of predetermined area and contour positioned substantially at the entrance pupil of the optical system adjacent said condenser, a composite light-polarizing element fixedly positioned adjacent the back focal plane of said objective, including a plurality of areas related in contour to that of said light source and having directions of polarization at right angles to one another, said polarizing areas being adapted to substantially individually intercept said deviated and undeviated spectra and to differently polarize the same, birefringent means positioned between said light-polarizing element and the eyepiece for modifying the phase of at least one of said deviated and undeviated spectra after differential polarization thereof, said birefringent element having a crystallographic axis in the plane thereof and parallel to one of said directions of polarization, and a second light-polarizing element positioned between said birefringent element and the exit pupil of the system adapted to coact with said first-named light-polarizing element and birefringent means to provide a desired amplitude relation between said deviated and undeviated spectra, at least one of said last-named polarizing element and birefringent means being mounted for progressive positional adjustment with respect to another so that gradual alteration of contrast in an image of the object may be obtained.

4. Light modifying means for inclusion in the optical system of a microscope incorporating a condenser, an objective and an eyepiece suitably positioned along an optical axis thereof, said light modifying means being adapted to provide gradual changes of phase and amplitude of deviated and undeviated spectra emanating from a specimen and comprising a diaphragm positioned substantially at the entrance pupil of the microscope adjacent said condenser having aperture means predeterminedly formed therein for admitting light to the optical system, a composite light-polarizing element fixedly positioned adjacent the back focal plane of said objective, including a plurality of areas related in contour to said diaphragm aperture and having directions of polarization at right angles to one another, said polarizing areas being adapted to substantially individually intercept said deviated and undeviated spectra and to differently polarize the same, birefringent means positioned between said light-polarizing element and the eyepiece for modifying the phase of at least one of said deviated and undeviated spectra after differential polarization thereof, and a second light-polarizing element positioned between said birefringent element and the exit pupil of the microscope adapted to coact with said first-named light-polarizing element and birefringent means to provide desired amplitudes of deviated and undeviated spectra, said last-named light-polarizing element being mounted for rotation about the optical axis of the microscope so that gradual alteration of contrast in an image of the specimen may be obtained.

5. Light modifying means for inclusion in an optical system incorporating a condenser and an objective suitably positioned along an optical axis thereof, said light modifying means being adapted to provide gradual changes of phase and amplitude of deviated and undeviated spectra emanating from an object under observation and comprising means providing a light source of predetermined area and contour positioned substantially at the entrance pupil of the optical system adjacent said condenser, a composite light-polarizing element fixedly positioned adjacent the back focal plane of said objective including a plurality of areas related in contour to that of said light source and having directions of polarization at right angles to one another, said polarizing areas being adapted to substantially individually intercept said deviated and undeviated spectra and to differently polarize the same, birefringent means positioned between said light-polarizing element and the eyepiece for modifying the phase of at least one of said deviated and undeviated spectra after differential polarization thereof, and a second light-polarizing element positioned between said birefringent element and the exit pupil of the system adapted to coact with said first-named light-polarizing element and birefringent means to provide a desired amplitude relation between different portions of said spectra, said birefringent means being mounted for tilting the same with respect to the optical axis of the microscope so that gradual alteration of contrast in an image of the object may be obtained.

6. Light modifying means for inclusion in the optical system of a microscope incorporating a condenser, an objective and an eyepiece suitably positioned along an optical axis thereof, said light modifying means being adapted to provide gradual changes of phase and amplitude of deviated and undeviated spectra emanating from a specimen and comprising a diaphragm positioned at the entrance pupil of the microscope adjacent said condenser having aperture means of predetermined contour formed therein for admitting light to the optical system, a composite light-polarizing element fixedly positioned adjacent the back focal plane of said objective, including a plurality of areas related in contour to said diaphragm aperture and having directions of polarization at right angles to one another, said polarizing areas being adapted to substantially individually intercept said deviated and undeviated spectra and to differently polarize the same, birefringent means positioned between said light-polarizing element and the eyepiece for modifying the phase of at least one of said deviated and undeviated spectra after differential polarization thereof, and a second light-polarizing element positioned between said birefringent element and the exit pupil of the microscope adapted to coact with said first-named light-polarizing element and birefringent means to provide a desired amplitude relation between said deviated and undeviated spectra, said birefringent means being mounted for angular movement with respect to the optical axis of the microscope so that gradual alteration of contrast in an image of the specimen may be obtained.

7. Light modifying means for inclusion in the optical system of a microscope incorporating a condenser, an objective and an eyepiece suitably positioned along an optical axis thereof, said light modifying means being adapted to provide gradual changes of phase and amplitude of deviated and undeviated spectra emanating from a specimen and comprising a diaphragm positioned at the entrance pupil of the microscope adjacent said condenser having aperture means of predetermined contour formed therein for admitting light to the optical system, a composite light-polarizing element fixedly positioned adjacent the back focal plane of said objective, including a plurality of areas related in contour to said diaphragm aperture and having directions of polarization at right angles to one another, said polarizing areas being adapted to substantially individually intercept said deviated and undeviated spectra and to differently polarize the same, birefringent means positioned between said light-polarizing element and the eyepiece for modifying the phase of at least one of said deviated and undeviated spectra after differential polarization thereof, and a second light-polarizing element positioned between said birefringent element and the exit pupil of the microscope adapted to coact with said first-named light-polarizing element and birefringent means to provide a desired amplitude relation between said deviated and undeviated spectra, said birefringent means being mounted for rotation with respect to the optical axis of the microscope so that gradual alteration of contrast in an image of the specimen may be obtained.

8. Light modifying means for inclusion in an optical system incorporating a condenser and an objective, said light modifying means being adapted to provide gradual changes of phase and amplitude of deviated and undeviated spectra emanating from an object under observation and comprising means providing a light source of predetermined area and contour positioned substantially at the entrance pupil of the optical system adjacent said condenser, a composite light-polarizing element positioned adjacent the back focal plane of said objective, including a plurality of areas related in contour to that of said light source and having different directions of polarization, said polarizing areas being adapted to substantially individually intercept said deviated and undeviated spectra and to differently polarize the same, birefringent means comprising a plurality of light-transmitting components positioned between said light-polarizing element and an image plane of the optical system for modifying the phase of at least one of said deviated and undeviated spectra after differential polarization thereof, and a second light-polarizing element positioned between said birefringent element and the exit pupil of the system adapted to coact with said first-named light-polarizing element and birefringent means to provide a desired amplitude relation between said deviated and undeviated spectra, at least one of said birefringent components being mounted for gradual positional adjustment with respect to one another and to the optical axis so that gradual alteration of contrast in an image of the object may be obtained.

9. Light modifying means for inclusion in an optical system incorporating a condenser and an objective, said light modifying means being adapted to provide gradual changes of phase and amplitude of deviated and undeviated spectra emanating from a specimen and comprising means providing a light source of predetermined area and contour positioned substantially at the entrance pupil of the optical system adjacent said condenser, a composite light-polarizing element positioned adjacent the back focal plane of said objective including a plurality of areas related in contour to that of said light source and having different directions of polarization, said polarizing areas being adapted to substantially individually intercept said deviated and undeviated spectra and to differently polarize the same, birefringent means comprising a plurality of light-transmitting components positioned between said light-polarizing element and an image plane of the optical system for modifying the phase of at least one of said deviated and undeviated spectra after differential polarization thereof, and a second light-polarizing element positioned between said birefringent element and the exit pupil of the system adapted to coact with said first-named light polarizing element and birefringent means to provide desired amplitudes of deviated and undeviated spectra, each of said birefringent components being mounted for individual gradual rotation with respect to one another about the optical axis and for rotation as a unit about said axis so that gradual alteration of contrast in an image of the object may be obtained.

10. Light modifying means for inclusion in the optical system of a microscope incorporating a condenser, an objective and an eyepiece, said light modifying means being adapted to provide gradual changes of phase and amplitude of deviated and undeviated spectra emanating from a specimen and comprising a diaphragm positioned at the entrance pupil of the microscope adjacent said condenser having aperture means of predetermined contour formed therein for admitting light to the optical system, a composite light-polarizing element positioned adjacent the back focal plane of said objective, including a plurality of areas related in contour to said diaphragm aperture and having different directions of polarization, said polarizing areas being adapted to substantially individually intercept said deviated and undeviated spectra and to differently polarize the same, birefringent means comprising a plurality of light-transmitting components positioned between said light-polarizing element and the eyepiece for modifying the phase of at least one of said deviated and undeviated spectra after differential polarization thereof, and a second light-polarizing element positioned between said birefringent element and the exit pupil of the microscope adapted to coact with said first-named light-polarizing element and birefringent means to provide a desired amplitude relation between said deviated and undeviated spectra, each of said birefringent components being rotatable, having a different birefringence and being individually positionable so as to intersect the optical axis so that both stepwise and gradual alteration of contrast in an image of the specimen may be obtained.

11. Light modifying means for inclusion in an optical system incorporating a condenser and an objective suitably positioned along an optical axis thereof, said light modifying means being adapted to provide gradual changes of phase and amplitude of deviated and undeviated spectra emanating from a specimen and comprising means providing a light source of predetermined area and contour positioned substantially at the entrance pupil of the optical system adjacent said condenser, a composite light-polarizing element positioned adjacent the back focal plane of said objective including a plurality of areas related in contour to that of said light source and having different directions of polarization, said polarizing areas being adapted to substantially individually intercept said deviated and undeviated spectra and to differently polarize the same, a second light-polarizing element positioned along said optical axis at any convenient position prior to said composite light-polarizing element, birefringent means positioned between said light-polarizing element and an image plane of the optical system for modifying the phase of at least one of said deviated and undeviated spectra after differential polarization thereof, and a third light-polarizing element positioned between said birefringent element and the exit pupil of the system adapted to coact with said first-named light-polarizing element and birefringent means to provide a desired amplitude relation between said deviated and undeviated spectra, at least one of said light-polarizing elements and birefringent means being mounted for progressive positional adjustment with respect to another so that gradual alteration of contrast in an image of the object may be obtained.

12. Light modifying means for inclusion in an optical system incorporating a condenser, an objective and an eyepiece, said light modifying means being adapted to provide gradual changes of phase and amplitude of deviated and undeviated spectra emanating from an object under observation and comprising means providing a light source of predetermined area and contour positioned substantially at the entrance pupil of the microscope adjacent said condenser, a composite light-polarizing element fixedly positioned adjacent the back focal plane of said objective including a plurality of areas related in contour to that of said light source and having different directions of polarization, said polarizing areas being adapted to substantially individually intercept said deviated and undeviated spectra and to differently polarize the same, birefringent means positioned between said light-polarizing element and the eyepiece for modifying the phase of at least one of said deviated and undeviated spectra after differential polarization thereof, and a second light-polarizing element positioned between said birefringent element and the exit pupil of the system adapted to coact with said first-named light-polarizing element and birefringent means to provide a desired amplitude relation between said deviated and undeviated spectra, both said light-polarizing element and birefringent means being mounted for progressive positional adjustment with respect to one another so that gradual alteration of contrast in an image of the object may be obtained.

13. Light modifying means for inclusion in an optical system incorporating a condenser and an objective, suitably positioned along an optical axis thereof, said light modifying means being adapted to provide gradual changes of phase and amplitude of deviated and undeviated spectra emanating from an object under observation and comprising means providing a light source of predetermined area and contour positioned substantially at the entrance pupil of the microscope adjacent said condenser, a composite light-polarizing element positioned adjacent the back focal plane of said objective, including a plurality of areas related in contour to that of said light source and having different directions of polarization, said polarizing areas being adapted to substantially individually intercept said deviated and undeviated spectra and to differently polarize the same, a second light-polarizing element positioned along said optical axis at any convenient position prior to said composite light-polarizing element and mounted for rotation about said optical axis, birefringent means positioned between said composite light-polarizing element and an image plane of the optical system for modifying the phase of at least one of said deviated and undeviated spectra after differential polarization thereof, and a third light-polarizing element positioned between said birefringent element and the exit pupil of the system adapted to coact with the aforesaid light-polarizing elements and birefringent means to provide a desired amplitude relation between said deviated and undeviated spectra, at least one of said light-polarizing elements and birefringent means being mounted for gradual positional adjustment with respect to another so that gradual alteration of contrast in an image of the object may be obtained.

14. Light modifying means for inclusion in the optical system of a microscope incorporating a condenser, an objective and an eyepiece, said light modifying means being adapted to provide gradual changes of phase and amplitude of deviated and undeviated spectra emanating from a specimen and comprising a diaphragm positioned at the entrance pupil of the microscope adjacent said condenser having aperture means of predetermined contour formed therein for admitting light to the optical system, a composite light-polarizing element positioned adjacent the back focal plane of said objective including a plurality of areas related in contour to said diaphragm aperture and having different directions of polarization, said polarizing areas being adapted to substantially individually intercept said deviated and undeviated spectra and to differently polarize the same, birefringent means positioned between said light-polarizing element and the eyepiece for modifying the phase of at least one of said deviated and undeviated spectra after differential polarization thereof, and a second light-polarizing element positioned between said birefringent element and the exit pupil of the microscope adapted to coact with said first-named light-polarizing element and birefringent means to provide desired amplitudes of deviated and undeviated spectra, said light-polarizing elements and birefringent means being adapted to be positioned contiguous one another in the order defined adjacent said back focal plane of the objective and at least one of said light-polarizing elements and birefringent means being mounted for progressive positional adjustment with respect to another so that gradual alteration of contrast in an image of the specimen may be obtained.

15. Light modifying means for inclusion in the optical system of a microscope incorporating a condenser, an objective and an eyepiece, said light modifying means being adapted to provide gradual changes of phase and amplitude of deviated and undeviated spectra emanating from a specimen and comprising a diaphragm positioned at the entrance pupil of the microscope adjacent said condenser having annular aperture means of predetermined diameter formed therein for admitting light rays to the optical system, a composite light-polarizing element positioned adjacent the back focal plane of said objective, including a plurality of areas geometrically similar to said annular diaphragm aperture and having different directions of polarization, said polarizing areas being adapted to substantially individually intercept said deviated and undeviated spectra and to differently polarize the same, birefringent means positioned between said light-polarizing element and the eyepiece for modifying the phase of at least one of said deviated and undeviated spectra after differential polarization thereof, and a second light-polarizing element positioned between said birefringent element and the exit pupil of the microscope adapted to coact with said first-named light-polarizing element and birefringent means to provide a desired amplitude relation between deviated and undeviated spectra, at least one of said light-polarizing elements and birefrigent means being mounted for gradual positional adjustment with respect to another so that gradual alteration of contrast in an image of the specimen may be obtained.

16. Light modifying means for inclusion in an optical system incorporating a condenser, an objective and an eyepiece suitably positioned along an optical axis thereof, said light modifying means being adapted to provide gradual changes of phase and amplitude of deviated and undeviated spectra emanating from an object under observation and comprising means providing a light source of predetermined area and contour positioned substantially at the entrance pupil of the optical system adjacent said condenser, a composite light-polarizing element positioned adjacent the back focal plane of said objective including a plurality of areas related in contour to that of said light source and having different directions of polarization, said polarizing areas being adapted to substantially individually intercept said deviated and undeviated spectra and to differently polarize the same, birefringent means positioned between said light-polarizing element and an image plane of the optical system for modifying the phase of at least one of said deviated and undeviated spectra after differential polarization thereof, a second light-polarizing element positioned between said birefringent element and said image plane adapted to coact with said first-named light-polarizing element and birefringent means to provide a desired amplitude relation between deviated and undeviated spectra, at least one of said light-polarizing elements and birefringent means being mounted for gradual positional adjustment with respect to another so that gradual alteration of contrast in an image of the object may be obtained, and diverging and converging lens means positioned respectively along said optical axis before and after a combination of said birefringent means and second-named light-polarizing element for providing parallel rays of said deviated and undeviated spectra through said combined components.

HAROLD OSTERBERG.
ALVA H. BENNETT.

REFERENCES CITED

The following references are of record in the file of this patent:

UNITED STATES PATENTS

| Number | Name | Date |
|---|---|---|
| 2,105,671 | Roesch | Jan. 18, 1938 |

FOREIGN PATENTS

| Number | Country | Date |
|---|---|---|
| 636,168 | Germany | Oct. 7, 1936 |

OTHER REFERENCES

Leiss: Die Optischen Instrumente, 1899, published by Wilhelm Engelmann, Leipzig, Germany, pages 174 to 177 inc.